United States Patent
Prasad et al.

(10) Patent No.: US 7,774,251 B1
(45) Date of Patent: Aug. 10, 2010

(54) SYSTEMS AND METHODS FOR PROVIDING DYNAMIC INTEGRATION AND ACCESS TO DISPARATE DATA SOURCES

(75) Inventors: Bharat Prasad, San Antonio, TX (US); Randy Bear, San Antonio, TX (US); Jeff Dennes, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 766 days.

(21) Appl. No.: 11/464,147

(22) Filed: Aug. 11, 2006

(51) Int. Cl.
  *G06Q 40/00* (2006.01)
(52) U.S. Cl. .............................. 705/35; 705/39; 705/42; 715/200; 709/223
(58) Field of Classification Search .................. 705/35, 705/39, 42
  See application file for complete search history.

(56) References Cited

U.S. PATENT DOCUMENTS

| | | | | |
|---|---|---|---|---|
| 5,699,528 | A * | 12/1997 | Hogan | 705/40 |
| 5,963,925 | A | 10/1999 | Kolling et al. | |
| 6,385,595 | B1 | 5/2002 | Kolling et al. | |
| 2002/0138316 | A1 | 9/2002 | Katz et al. | |
| 2003/0208394 | A1* | 11/2003 | Burris et al. | 705/10 |
| 2005/0125321 | A1* | 6/2005 | Gerstner et al. | 705/35 |
| 2006/0282359 | A1 | 12/2006 | Nobili et al. | |
| 2007/0239587 | A1 | 10/2007 | Tsigutkin et al. | |

OTHER PUBLICATIONS

"Data Integration—Multiple Sources, One Result: Actionable Marketing and Business Intelligence", http://www.topica.com/solutions/data_integration.html, (Aug. 9, 2006), 2 p.
"Data Integration Products", http://www.businessobjects.com/products/dataintegration/default.asp, (Aug. 9, 2006), 2 p.
"IBM Information Server Preview", http://www-306.ibm.com/software/data/integration/info_server/, (Aug. 9, 2006), 1 p.
"MapForce—Visual Data Integration and Web Services Implementation Tool", http://altova.com/products/mapforce/data_mapping.html, (Aug. 9, 2006), 6 p.

* cited by examiner

*Primary Examiner*—Vanel Frenel
(74) *Attorney, Agent, or Firm*—Townsend and Townsend and Crew LLP

(57) ABSTRACT

Systems and methods for providing dynamic integration and access to disparate data sources are described. The apparatus may include an internal data source access engine, an external data source access engine, an integration engine and a user interface module. The method may comprise receiving a request for bill-pay services from a user, first retrieving internal bill-pay information, second retrieving external bill-pay information, integrating the first retrieved and second retrieved information into a single unified graphical presentation, presenting the unified graphical presentation to the user.

15 Claims, 7 Drawing Sheets

SYSTEMS AND METHODS FOR PROVIDING DYNAMIC INTEGRATION AND ACCESS TO DISPARATE DATA SOURCES

RELATED APPLICATIONS

This disclosure is related to pending U.S. patent application Ser. No. 11/464,159 titled "SYSTEMS AND METHODS FOR PROVIDING DYNAMIC INTEGRATION AND ACCESS TO DISPARATE DATA SOURCES," and U.S. patent application Ser. No. 11/464,170, titled "SYSTEMS AND METHODS FOR PROVIDING DYNAMIC INTEGRATION AND ACCESS TO DISPARATE DATA SOURCES," filed on an even date herewith.

TECHNICAL FIELD

This application relates to systems and methods for data integration and access and more particularly to dynamically integrating and providing access to disparate data sources.

BACKGROUND

Customers demand more of the products and services they use than ever before. They insist that the companies they deal with on a regular basis provide them greater and greater levels of information and access. These companies are configuring and operating more and more complex systems that are capable of delivering highly integrated services to those customers.

However, those same companies face a dilemma when their customers use the products of many other companies concurrent with their own. Inter-company cooperation and data sharing, though at opposition with that company's desire to ever increase the number of products a particular customer uses with them, has become commonplace. But a better manner of providing those customers access to those competing companies but still maintains a relationship between the customer and the company providing that access is needed.

SUMMARY

In an embodiment, an apparatus to unify disparate data sources into a single user interface is described. The apparatus comprises an internal data source access engine having a plurality of internal data source software objects, an external data source access engine having at least one external data source software object, an integration engine to receive information from both the internal and external data source access engines and to combine the information into a single unified data set and a user interface module to graphically format the unified data set. In an embodiment, the external data source software objects are configured to provide access to data maintained by a system external to the apparatus.

In an embodiment, a method of unifying disparate data sources is described. The method comprises receiving a request from a user for access to bill-pay services, first retrieving internal bill pay information, second retrieving external bill pay information, integrating the first received and second received information in a unified graphical presentation and presenting the unified graphical presentation to the user. The external bill pay information is retrieved using an external data source software object configured to access and an external data source using a pre-defined interface configuration.

In an embodiment, a system for providing unified graphical presentation of disparate data sources is described. The system comprises a user access system providing one or more users access to present account data, a bill-pay engine configured to integrate data retrieved from both internal and external data sources through a software object and to present the integrated data as a single unified data set to one of the one or more users, and a plurality of internal data stores. The bill-pay engine further comprises an internal data source access engine to access the plurality of internal data stores through an internal data source software object, an external data source access engine to access data maintained by an external data system through an external data source software object.

BRIEF DESCRIPTION OF DRAWINGS

Embodiments are illustrated by way of example and not limitation in the figures of the accompanying drawings, in which like references indicate similar elements and in which.

DETAILED DESCRIPTION

In the following detailed description of example embodiments, reference is made to the accompanying drawings, which form a part hereof, and in which is shown, by way of illustration, specific embodiments in which the example method, apparatus, and system may be practiced. It is to be understood that other embodiments may be utilized and structural changes may be made without departing from the scope of this description.

The term "disparate" as used herein is meant to denote systems that are maintained by separate providers. In the present discussion, distinction is made between systems maintained internally by a provider and systems maintained external to the provider. Disparate is used to denote that difference.

Figure 1:
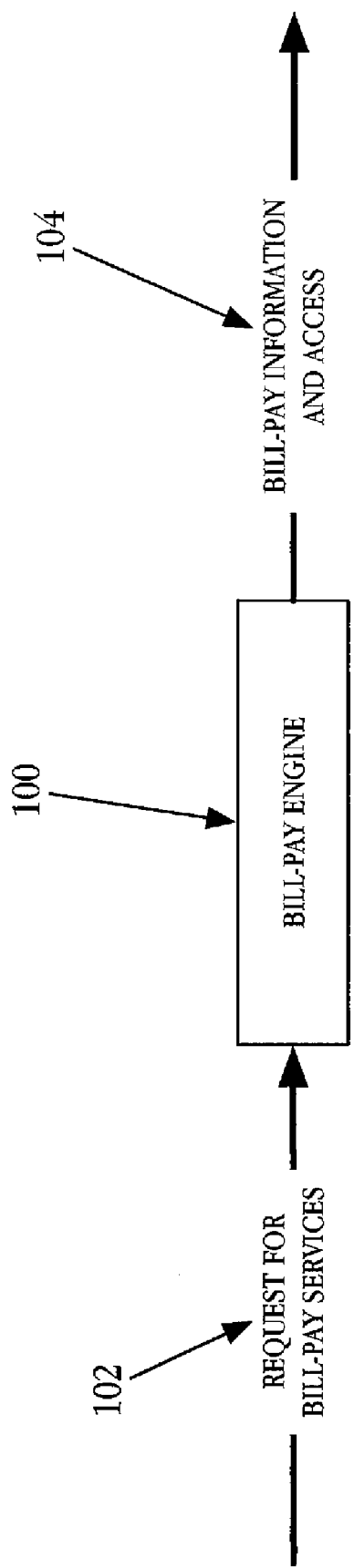
FIG. 1 shows a high level block diagram of an apparatus for providing bill-pay information and access to a user, in accordance with an example embodiment.

FIG. 1 shows a high level block diagram of an apparatus for providing bill-pay information and access to a user, in accordance with an example embodiment. In an embodiment, a bill-pay engine 100 receives a request for bill-pay-services 102 from a user and outputs back to the user bill-pay information and access 104. Bill-pay services are computer implemented systems used by customers to pay for one or more of their pending bills. Through use of a bill-pay service, a customer can pay their credit card bill from their checking account at the same bank without the need to write a check and send the payment through the mail system. Alternatively, the customer can register with a service that will interface with one or more other vendors, and through the service, the customer can affect payment of any variety of pending bills. In some cases, a funds transfer request is initiated which will transfer funds from a payment source of the customer to the payment destination. In other cases, the service will request funds from the payment source and issue a physical check, which the service will then send through the mail to the destination. In all cases, the customer has the convenience of attending to some portion of their financial obligations through a web-enabled online interface.

The request for bill-pay services 102 may be received through any suitable means, such as interaction with a web browser that is communication with a bill-pay server. The actual mechanism of connection is outside the scope of the present discussion. The request is processed by a bill-pay engine 100 which then provides the customer access and information. Information may include, without limitation, amount of funds available for payment, amount due for one or more pending bills, remaining balance on one or more credit card devices, and the like, in one example. In such an example, the bill-pay engine 100 interfaces with accounts that are maintained by the same entity that operates the bill-pay engine 100. For instance, the customer may have a checking account, a credit card and an auto-loan with a bank. The bank provides the customer bill pay services, through which the customer can access accounts that are maintained by the bank, but provides no access to other accounts of the customer. The customer, in an alternate example, would subscribe to a service which would provide bill-pay services to the customer's other financial accounts. The bank may negotiate a discount for the service or assist in signing the customer up for the service, but the customer would be required to login to the bank's bill pay services separately from the service.

Figure 2:
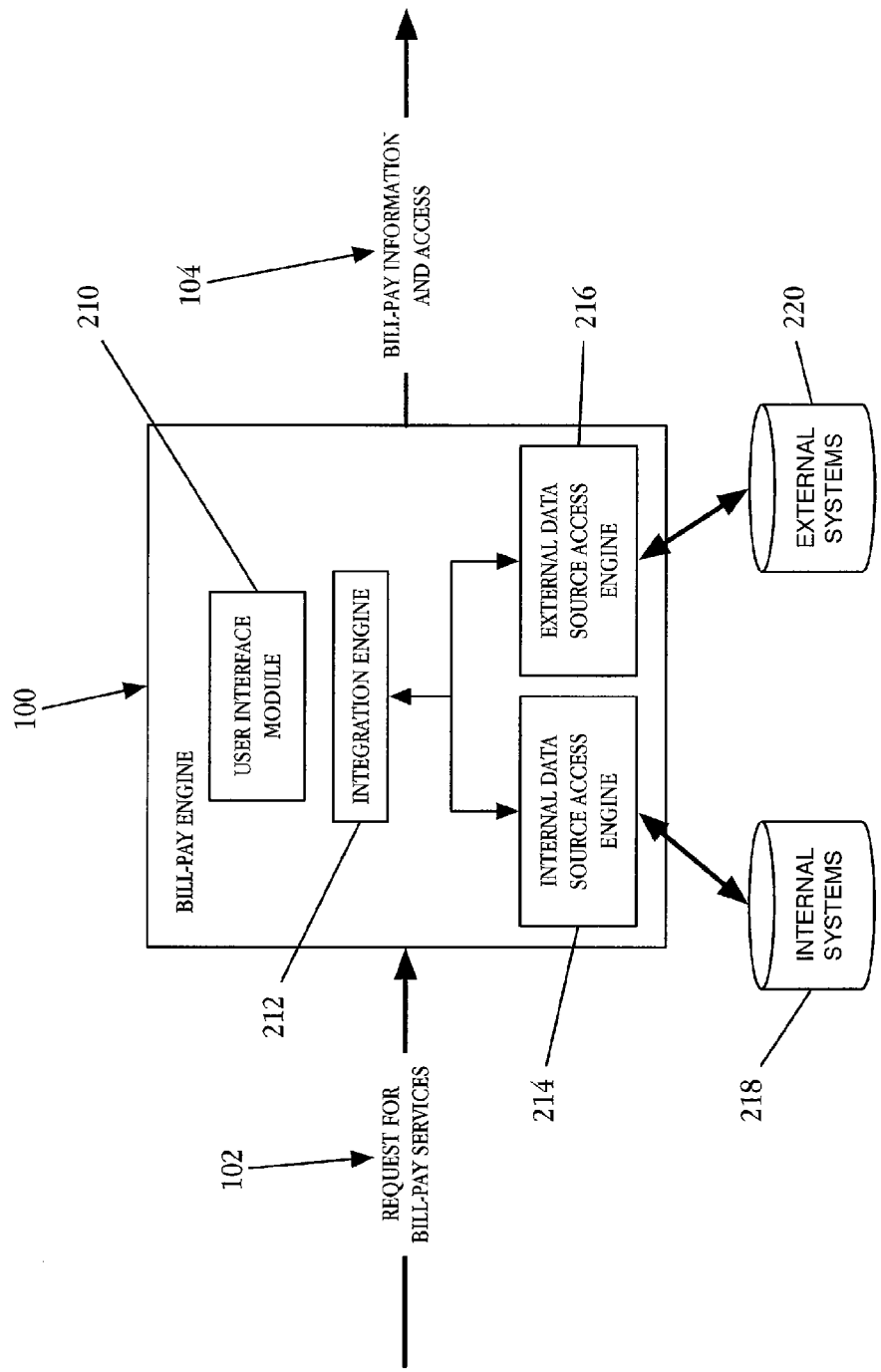
FIG. 2 shows a more detailed block diagram of an apparatus for providing bill-pay information and access to a user, in accordance with an example embodiment.

FIG. 2 shows a more detailed block diagram of an apparatus for providing bill-pay information and access to a user, in accordance with an example embodiment. In one embodiment, the bill-pay engine 100 is configured to provide to the user a single interface to both internal and external bill-pay services. The bill-pay engine 102, in such an example, includes a user interface module 210, an integration engine 212, an internal data source access engine 214 and an external data source access engine 216. The bill-pay engine 100 receives a request for bill-pay services 102 as an input, and as described above, and outputs to the customer bill-pay information and access 104. The bill-pay information and access 104 contemplated in FIG. 2 is a single interface into both accounts maintained by the operator of the bill-pay engine 100 and accounts not maintained by them.

The internal data source access engine 214 is configured to access a plurality of internal systems 218. Each of the internal systems 218 is computer system that maintains account information for an account offered by the operator of the bill-pay engine 100. The internal systems 218 each additionally provide financial services to the customer. This may include one or more of the following, without limitation, depositing of funds, withdrawal of funds, and monetary satisfaction of present purchases where the customer pays back the amount of the present purchase over time (credit card services). Any system that has the ability to electronically receive or send funds is considered to be within the scope of the present discussion. Each of the internal systems 218 is accessed through an internal data source software object (not shown in FIG. 2). The internal data source software object is configured to translate instructions received from the integration engine 212 into instructions executable by at least one of the internal systems 218. In one embodiment, the internal data source software object is a J2EE software object. In an alternate embodiment, the internal data source software object is a web services software object. Through such a mechanism, the integration engine 212 issuing instructions for account access need only know a simple set of rules that can be standardized across all of the internal data source software objects and does not need to be reprogrammed every time a new system is put in place internally.

The external data source access engine 216 is configured to access one or more external systems 220. Each of the one or more external systems 220 is a computer system that maintains financial information or financial accounts of the customer that is not maintained by the operator of the bill-pay engine 100. Typically, the operator of the bill-pay engine 100 contracts with the operator of the external system 220, the contract providing the services of the external system 220 to the customers of the operator of the bill-pay engine. Those services allow the customer to attend to financial obligations apart from the financial obligations they have to the operator of the bill-pay engine 100. Through this mechanism, the customer may click through the interface providing bill-pay services to internal systems 218 to the external systems 220, requiring the customer to separately attend to financial obligations with the operator of the bill-pay engine 100 and others. However, using the systems and methods described herein, and the integration engine 212, the user can be presented with a single user interface that provides them access to all of the bill-pay services they are entitled to. The external data source access engine 216 accesses the one or more external systems 220 through an external data source software object, in one example. In one embodiment, the external data source software object is a web services software object and is configured to provide access to the one or more external systems 220 using the web services protocol. Further discussion of the external data source software objects is provided below with respect to FIG. 4.

Figure 3:
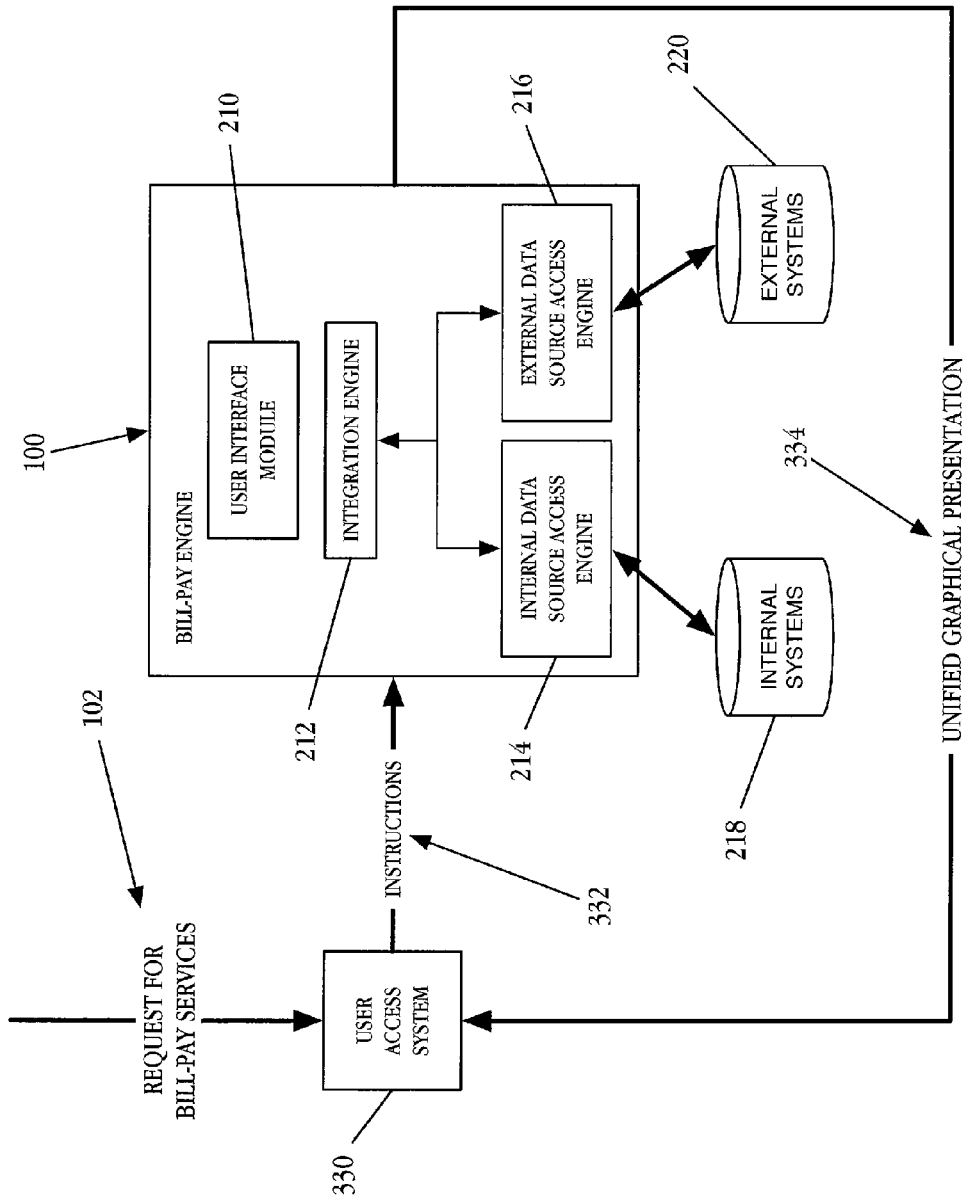
FIG. 3 shows a more detailed block diagram of an apparatus for providing bill-pay information and access to a user, in accordance with an example embodiment.

FIG. 3 shows a more detailed block diagram of an apparatus for providing bill-pay information and access to a user, in accordance with an example embodiment. The apparatus depicted in FIG. 3 is similar to that depicted in FIG. 2 with the addition of a user access system 330 which is coupled to the bill-pay engine 100 and is configured to receive a plurality of user requests, at least one of which is a request for bill-pay services 102. The user access system 330 is configured to format and transmit a graphical user interface to a user, and through the graphical user interface provide the user the ability to interact with and manipulate one or more financial accounts or services provided by the operator of the bill-pay engine 100.

The user access system 330 is communicatively coupled to the bill-pay engine 100 and is configured to send machine-readable instructions 332 to the bill-pay engine 100. Those instructions 332 are to cause the bill-pay engine 100 to access one or more internal and one or more external systems 218 and 220, respectively. The one or more internal systems 218 and the one or more external systems 220 are systems that maintain financial account data for a user. The bill-pay engine 100 performs substantially the same operations as described above with respect to FIG. 2, with the exception of a unified graphical presentation 334 output. As discussed above, one of the limitations of present day systems is a limited user experience with respect to bill-pay services. For many reasons, financial institutions providing online bill-pay services for internal accounts are unable to provide an interface to other financial institutions for direct manipulation of other financial accounts, two of which are the ability to send funds to and withdraw funds from those financial accounts. To provide some level of bill-pay services, the financial institution may provide a link to an external provider, and even pay for the service the provider makes available. However, the entire experience that the user has with the external provider is separate from that they have with the financial institution.

The integration engine 212 provides the bill-pay engine 100 the ability to retrieve information from and provide access to both internal and external systems concurrently, in one example. The unified graphical presentation 334 formatted by the user interface module 210 and provided as an output from the bill-pay engine 100 to the user access system 330 delivers a single user interface to the user. The user can attend to all of their financial obligations, whether those financial obligations are with the operator of the bill-pay engine 100, or not. Typically the operator of the bill-pay engine 100 would only interface with one external provider, or system, but more then one system may be accessed, without departing from the scope of the present discussion.

The unified graphical presentation 334 is transmitted to the user access system 330. In one embodiment, the unified graphical presentation 334 is combined with other materials and transmitted to the user. In an alternate embodiment, the unified graphical presentation 334 is received by the user access system 330 and transmitted directly to the user without the inclusion of any other materials.

The user access system 330 may be implemented as a web server, in one example. The user access system 330 through the use of any suitable interactive web technology provides an interactive experience to the user through which access to and maintenance of their financial obligations can be accomplished. Any technology that provides interactivity through a web browser is considered to be within the scope of the present discussion and may include, without limitation, hyper-text mark-up language (HTML), Dynamic HTML (DHTML), JavaScript, and Ajax.

Figure 4:
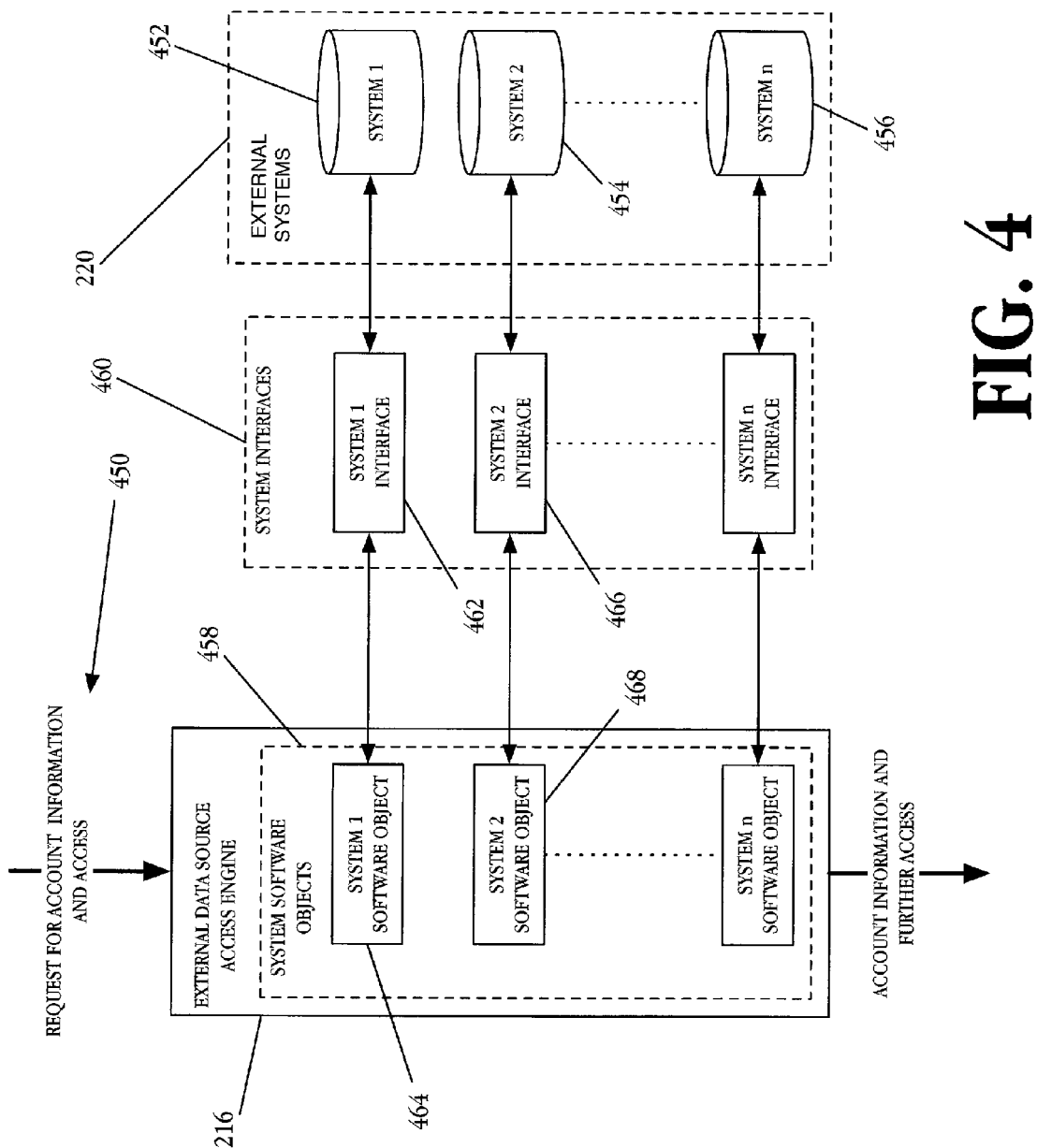
FIG. 4 shows a system for providing access to one or more external systems, in accordance with example embodiments.

FIG. 4 shows a system for providing access to one or more external systems, in accordance with example embodiments. General operations of the access to the one or more external systems 220 have been provided. A more detailed discussion of specific access operations and configuration can now be provided with reference to FIG. 4. In an embodiment, the external data source access engine 216 receives from the integration engine 212 a request for account information and access 450. This may include account access information where the specific account has not been access previously, otherwise known as an account set-up request. Through such an operation, a user can enable a new account to be setup for future bill-pay operations. It may also include specific account operations, such as transfer an amount of funds to a specific financial account to satisfy a pending obligation. It may further include instructions to the operator of one of the one or more external systems 220 to print and mail a physical check. In all of the examples, the integration engine 212 formats a generic message to send to the external data source access engine 216, the generic message of any suitable type including the following information, account name, type of account, action.

The external data source access engine 216 may be connected to a single external system 220, in one example. However, the external data source access engine 216 may be connected to multiple external systems, 1 to n (as shown in FIG. 4), in an alternate example. In the latter arrangement, operations for disparate account types may be handled by differing external systems. For instance, all of the external bill-pay operations for credit card accounts may be handled by a first external system 452, operations for all accounts where a physical check must be created may be handled by a second external system 454, while all other operations are handled by a third external system 456. Through such an arrangement, the costs associated with an external system provider may be reduced, such savings passed on to customers or retained as a profit of the operation.

The request for account information and access 450 is received by the external data source access engine 216 and is passed to the proper system software object. In the first example above, only one system software object is used and all requests are passed to that one system software object. In the second example above, the external data source access engine 216 first parses the request to determine which of the software objects operates on that request. Each of the system software objects 458, or external data source software object, is configured to receive the message and translate the message into instructions executable by the external system interface. In one embodiment, the system software object 458 is pre-configured with the interface requirements of the system interface 460. The interface requirements may be defined by a WSDL document, in one example, which is provided by the operator of the external system to the operator of the bill-pay engine 100. The interface requirements may alternately be defined by an application programming interface (API) document, which may also be provided by the operator of the external system. In an alternate embodiment, at least one of the system software objects 458 is configured to dynamically request and receive the WSDL document from the system interface 460. In such an arrangement, the WSDL document is received and then consumed by the system software object, which is configured to determine the proper translations between the message received from the integration engine and the proper commands to issue to the system interface 460 to perform the operations requested by the message received.

In the example of multiple external systems 220, each of the system software objects 458 are configured uniquely, insofar as the system interfaces 460 are unique. For example, The WSDL provided for system interface 1 462 may define a wholly different set of allowable operations to the system 1 software object 464, such as allowing new account set-up, bill-pay operations, real-time funds transfer confirmations, and the like. The system interface 2 466 may only allow account look-up operations to the system 2 software object 468. Therefore the configurations of system 1 software object 464 and system 2 software object 468 are unique. However, usage of multiple system software objects 458 to access one or many system interfaces 460 to the same external system 220 may be used, in an alternate embodiment. In such an arrangement, threading of operations and load-balancing may be achieved.

In all embodiments, the operations are continuous in that the integration engine 212 may require multiple operations to satisfy a particular user requirement. For example, an account set-up call may be followed by an account balance call, which may then be followed by a call to initiate a funds transfer to satisfy a pending balance. It may be advantageous, in some examples, to initiate a communications session between the system software object 458 and the system interface 460 that is persistent in that the session is not closed upon return of the account set-up confirmation, or receipt of the account balance. Alternately, the operations may be isochronous between the object and the interface in that each operation requires a new communications session to be initiated and set-up. Either type of communication arrangement may be used without departing from the scope of the present discussion.

The apparatus and systems described above with respect to FIGS. 1-4 may be implemented in hardware, software, firmware, or any combination thereof. Although depicted as separate modules in FIGS. 2-4, the functionality described above with respect to each of the modules or engines may be combined with other modules or engines without departing from the scope of the present application.

Figure 5:
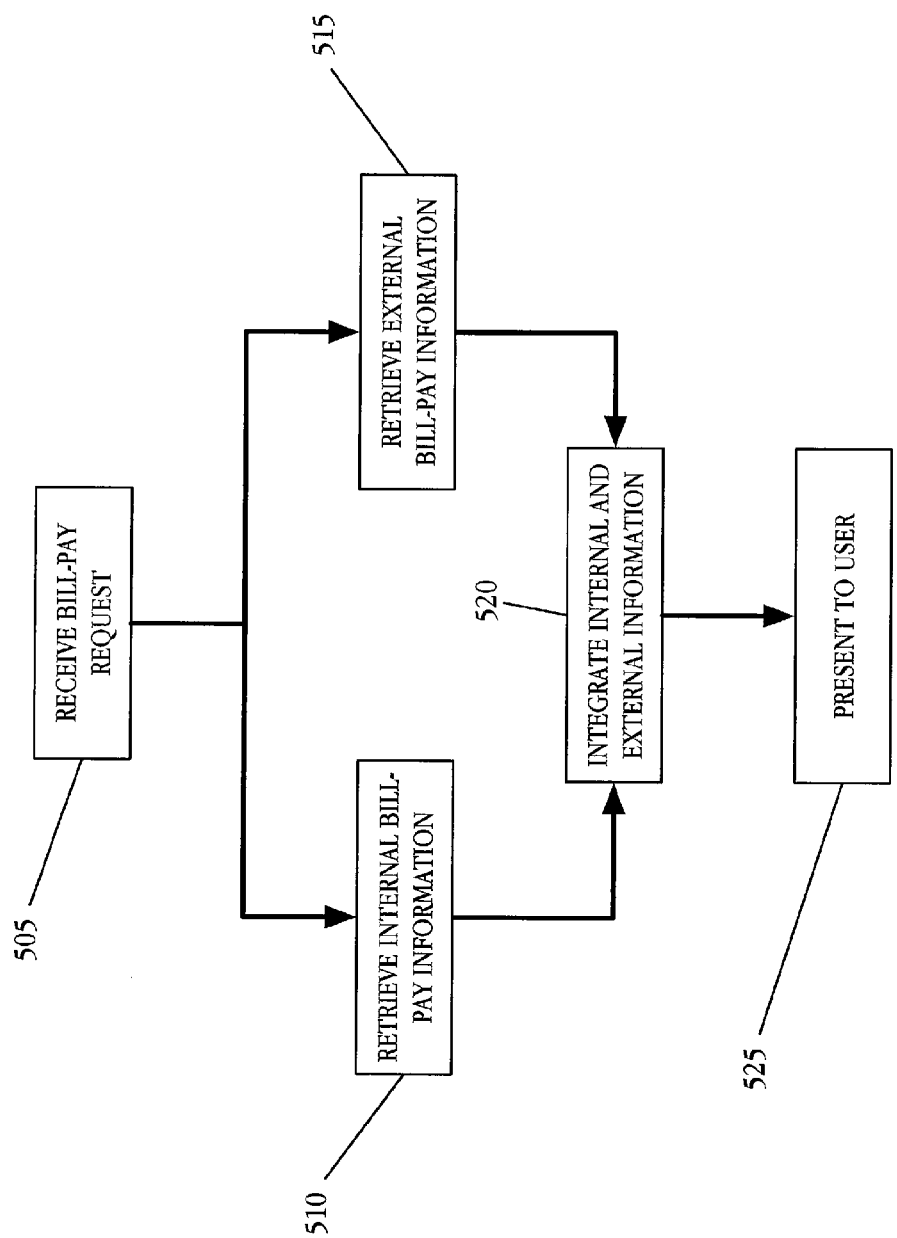
FIG. 5 shows a flowchart of a method for providing a unified user interface for bill pay information and access to a user, in accordance with an example embodiment.

FIG. 5 shows a flowchart of a method for providing a unified user interface for bill pay information and access to a user, in accordance with an example embodiment. The method depicted in FIG. 5 may be carried out on apparatus similar to that depicted in FIG. 2 and FIG. 3, and described above, in one example.

At block 505, a bill-pay request is received by the bill-pay engine 100. The request may contain any of the following, without limitation, request for account set-up, request for account balance, request for account listing, request for funds transfer to or from the account, request for account status, and the like. The bill-pay engine 100 determines which of the accounts referenced in the bill-pay request received at block 505 are maintained internally and which are maintained externally. At block 510, information is retrieved from the internal systems 218 by the internal data source access engine 214. At block 515, information is retrieved from the one or more external systems by the external data source access engine 216. As discussed above, retrieving information from the internal and external systems may be continuous, in that more then one retrieving operation is required. In such an arrangement, the access engines 214 and 218 may maintain a communicative connection with the internal and external systems for the purposes of retrieving information from the internal and external systems.

In one embodiment, the operations at block 510 and block 515 are performed concurrently. In an alternate embodiment, the operations at block 510 and block 515 are threaded such that a discrete communication to enable the operations at block 510 is performed first, and then a discrete communication to enable the operations at block 515 is performed second. Such an arrangement may be advantageous if the communications pipeline from the integration engine 212 to the access engines is limited. However, the preferred mode of operation is that block 510 and block 515 are performed concurrently and in parallel.

At block 520, the integration receives information from both the internal and external systems and integrates that information into a single unified graphical presentation 334, such as that described above with respect to FIG. 3. The single unified graphical presentation is then presented to the user at block 525. This may include transmission from a user access system 330, as described above to the user requesting bill-pay services. Alternately, the bill-pay engine 100 may interface directly with a computer system of the user. In such an arrangement, the functionality of the user access system 330 may be performed on a software object resident on the computer system of the user that provides secure communications with the bill-pay engine 100.

Figure 6:
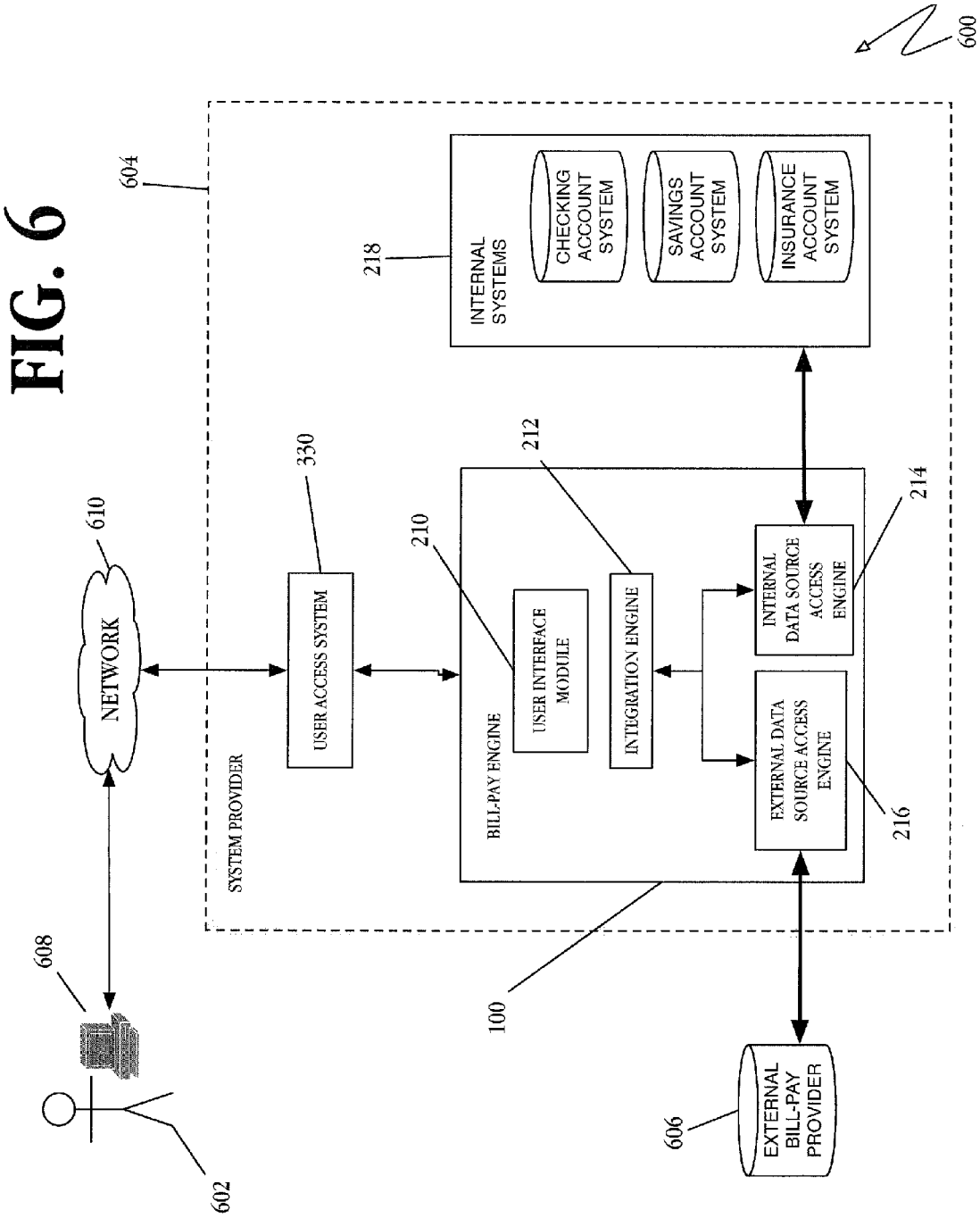
FIG. 6 shows a block diagram of a system that provides account access and information to a user, including bill-pay information and access, in accordance with an example embodiment.

FIG. 6 shows a block diagram of a system that provides account access and information to a user, including bill-pay information and access, in accordance with an example embodiment. The system 600 of FIG. 6 is an example implementation of the apparatus and methods described above. The system 600 includes a customer 602 interacting with a system provider 604, through a user access system 330, offering financial account services as well as bill-pay services so that the customer can attend to one or more financial obligations. The one or more financial obligations may include payment of an insurance premium to an insurance account system, maintained by the provider, in addition to financial obligations that can not be attended to through the one or more internal systems 218. For the purposes of this example, the customer has a checking account, savings account and an insurance account, which are all maintained by the system provider 604. The customer additionally has financial obligations that they can attend to through the use of an external bill-pay provider 606; the financial obligations include a pending credit card bill and a bill for sanitation services through the city in which they reside. The external bill-pay provider 606, in this example, operates an external system as described above with respect to FIG. 2-4.

The customer 602 initiates a request for bill-pay services on their computing device 608 to the user access system 330 through a network 610. The user access system 330 passes the request to the bill-pay engine 100 operated by the system provider 604. The bill-pay engine 100, through the use of the user interface module 210 presents a single user interface for bill-pay services back to the customer 602. Further operations are performed by the integration engine 212 of the bill-pay engine 100 to access both the internal systems 218 and the systems of the external bill-pay provider 606. The internal data source access engine 216 accesses each of the internal systems 218 to retrieve information about current account status and any pending financial obligations. The internal data source access engine 216 access the internal systems 218 through the use of internal data source software objects. The system provider 604 has control over the types of systems used to maintain the checking, savings and insurance accounts in this example, and the interfaces to them may be similar in nature allowing a single internal data source software object to access all three. However, using the apparatus described above with respect to the external systems in FIG. 4, the individual systems employed for each of the internal accounts may be unique and require an individual and unique software object configured to interface with it.

The external data source access engine 214 interfaces with the external bill-pay provider 606 through the use of an external data source software object as described above with respect to FIG. 4. Using FIG. 4 as a reference, the external bill-pay provider 606 in FIG. 6 would be the first of the external systems, or system 1 452, with no other external systems needed. Each of the external systems in FIG. 4 is a separate external bill-pay provider. In the present example, one external bill-pay provider 606 is used. The external bill-pay provider 606 in this example provides customers the ability to attend to financial obligations either electronically or through the use of physical checks. The customer 602 has a credit card account and a sanitation service through the city, which requires a physical check. The external data source access engine 214, through the external data source software object access the external bill-pay provider 606 and provides the integration engine information regarding the accounts registered with the external bill-pay provider 606 for the customer 602.

The integration engine 212 receives information from the internal and external data source access engines 214 and 216 and integrates that information into a single unified presentation, which is then sent to the user interface module 210 for presentation to the customer 602. Through this mechanism, the customer 602 can quickly see what outstanding financial obligations they have and the account status of sources from which they can satisfy those obligations, i.e. their checking account or savings account. The customer 602, having a pending bill for sanitation services in the amount of $50.00, a minimum payment due on their credit card of $100.00 and an insurance premium of $150.00 due in this example, issues a command through the user interface to the bill-pay engine 100 to pay each of these obligations. The command passes through the integration engine 212, in the case of the external bill-pay provider 606, to the external data source access engine 214. That command is translated by the external data source software object, configured to interface with the systems of the external bill-pay provider 606, and instructions are sent to the external bill-pay provider 606 to pay $100.00 to the credit card bank and to issue a physical check in the amount of $50.00 to the city for financial services. An additional command is sent through the internal data source access engine 216 to the internal systems to affect a transfer of funds from the checking account system to the insurance account system to satisfy the $150.00 premium due.

The external bill-pay provider 606 in this example may be configured with any financial account of the customer 602 that is capable of having funds withdrawn. That may include the checking account system in FIG. 6, or some other account. In the former example, the external bill-pay provider 606 issues a funds transfer request, which in typical bill-pay operations does not pass back through the bill-pay engine 100, but through some other means, such as an Automated Clearing House (ACH) transaction system, or with an electronic wire transfer through the Federal Reserve Bank system. Operations for the latter example proceed in similar manner. In either case, the customer 602 must pre-configure an account with the external bill-pay provider 606 that is suitable for the payment of financial obligations. Such configuration may also be through the external data source access engine 214 using operations and systems previously described.

In a further embodiment, the bill-pay engine 100 may additionally include a payment module (not shown in FIG. 6) that is configured to execute a funds transfer request between the internal and external systems. Through such an arrangement, the bill-pay engine 100 can execute funds transfers independent of an external bill-pay provider 606. This may be advantageous if the external bill-pay provider 606 only provides access to information and will not allow receipt of instructions intended to cause funds transfers. The funds transfer requests executed by the payment module may include, without limitation, an ACH transaction or a wire-transfer transaction.

FIG. 6 shows a block diagram of a machine including instructions to perform any one or more of the methodologies described herein. A system 700 includes a computer 710 connected to a network 714. The computer 710 includes a processor 720, a storage device 722, an output device 724, an input device 726, and a network interface device 728, all connected via a bus 730. The processor 720 represents a central processing unit of any type of architecture, such as a CISC (Complex Instruction Set Computing), RISC (Reduced Instruction Set Computing), VLIW (Very Long Instruction Word), or a hybrid architecture, although any appropriate processor may be used. The processor 720 executes instructions and includes that portion of the computer 710 that controls the operation of the entire computer. Although not depicted in FIG. 6, the processor 720 typically includes a control unit that organizes data and program storage in memory and transfers data and other information between the various parts of the computer 710. The processor 720 receives input data from the input device 726 and the network 714, reads and stores code and data in the storage device 722, and presents data to the output device 724.

Although the computer 710 is shown to contain only a single processor 720 and a single bus 730, the disclosed embodiment applies equally to computers that may have multiple processors, and to computers that may have multiple busses with some or all performing different functions in different ways.

The storage device 722 represents one or more mechanisms for storing data. For example, the storage device 722 may include read only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although the computer 710 is drawn to contain the storage device 722, it may be distributed across other computers, for example on a server.

Figure 7:
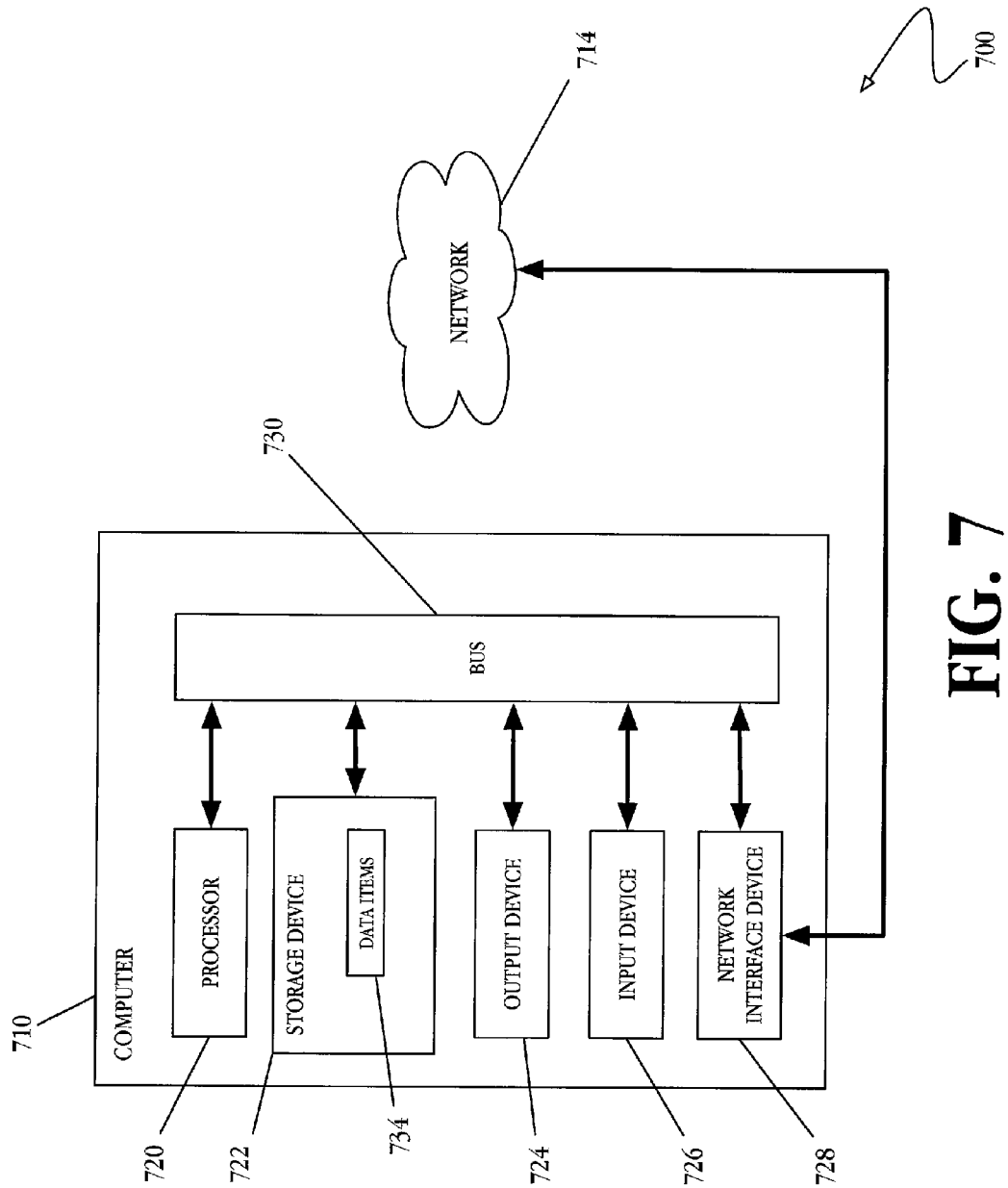
FIG. 7 shows a block diagram of a machine including instructions to perform any one or more of the methodologies described herein.

The storage device 722 includes a controller (not shown in FIG. 7) and data items 734. The controller includes instructions capable of being executed on the processor 720 to carry out the functions, as previously described above with reference to FIGS. 1-6. In another embodiment, some or all of the functions are carried out via hardware in lieu of a processor-based system. In one embodiment, the controller is a web browser, but in other embodiments, the controller may be a database system, a file system, an electronic mail system, a media manager, an image manager, or may include any other functions capable of accessing data items. Of course, the storage device 722 may also contain additional software and data (not shown), which is not necessary to understanding the invention.

Although the controller and the data items 734 are shown to be within the storage device 722 in the computer 710, some or all of them may be distributed across other systems, for example on a server and accessed via the network 714.

The output device 724 is that part of the computer 710 that displays output to the user. The output device 724 may be a liquid crystal display (LCD) well-known in the art of computer hardware. But, in other embodiments the output device 724 may be replaced with a gas or plasma-based flat-panel display or a traditional cathode-ray tube (CRT) display. In still other embodiments, any appropriate display device may be used. Although only one output device 724 is shown, in other embodiments any number of output devices of different types, or of the same type, may be present. In an embodiment, the output device 724 displays a user interface.

The input device 726 may be a keyboard, mouse or other pointing device, trackball, touchpad, touch screen, keypad, microphone, voice recognition device, or any other appropriate mechanism for the user to input data to the computer 710 and manipulate the user interface previously discussed. Although only one input device 726 is shown, in another embodiment any number and type of input devices may be present.

The network interface device 728 provides connectivity from the computer 710 to the network 714 through any suitable communications protocol. The network interface device 728 sends and receives data items from the network 714.

The bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

The computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of the computer 710. For example, other peripheral devices such as audio adapters or chip programming devices, such as EPROM (Erasable Programmable Read-Only Memory) programming devices may be used in addition to, or in place of, the hardware already depicted.

The network 714 may be any suitable network and may support any appropriate protocol suitable for communication to the computer 710. In an embodiment, the network 714 may support wireless communications. In another embodiment, the network 714 may support hard-wired communications, such as a telephone line or cable. In another embodiment, the network 714 may support the Ethernet IEEE (Institute of Electrical and Electronics Engineers) 802.3x specification. In another embodiment, the network 714 may be the Internet and may support IP (Internet Protocol). In another embodiment, the network 714 may be a local area network (LAN) or a wide area network (WAN). In another embodiment, the network 714 may be a hotspot service provider network. In another embodiment, the network 714 may be an intranet. In another embodiment, the network 714 may be a GPRS (General Packet Radio Service) network. In another embodiment, the network 714 may be any appropriate cellular data network or cell-based radio network technology. In another embodiment, the network 714 may be an IEEE 802.11 wireless network. In still another embodiment, the network 714 may be any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to provide a unified graphical presentation of disparate data sources to a user, the system comprising:
   a user access system to provide to one or more users access to present account data and to receive instructions for the manipulation of funds in one or more accounts of the one or more users;
   a bill-pay engine, the bill-pay engine including:
   an internal data source access engine, the internal data source access engine having a plurality of internal data source software objects, each of which configured to provide access to data maintained by an internal system;
   an external data source access engine, the external data source access engine having at least one external data source software object configured to provide access to data maintained by an external system;
   an integration engine to receive internal data from the internal data source access engine and external data the external data source access engine and to combine the internal data and the external data into a single unified data set; and
   a user interface module to receive the single unified data set and format it to be displayed graphically to a user, the user interface module to additionally send the formatted single unified data set to the web access gateway for further transmission to a computing device of the one or more users;
   a plurality of internal data stores, each of which accessible by at least one of the internal data source software objects; and
   a payment module configured to transmit instructions to the internal and external systems through the internal data source software object and the external data source software object, respectively, the instructions intended to generate a physical check payable from at least one of the internal and external systems and payable to at least one other of the internal and external systems.

2. The system of claim 1, wherein the at least one external data source software object is configured to access the external system using a web services framework, the access defined by a Web Services Definition Language (WSDL) published by the external system.

3. The system of claim 2, wherein the at least one external data source software object is a Java 2 Enterprise Edition (J2EE) web services client.

4. The system of claim 2, wherein the WSDL is consumed dynamically concurrent with the access.

5. The system of claim 1, wherein the plurality of internal data source software objects are pre-configured prior to accessing the data maintained by the at least one of the plurality of internal systems.

6. A machine-readable medium having machine-executable instructions to provide a unified graphical presentation of disparate data sources, the machine-executable instructions causing the following software modules to be executed:
   a user access system to provide to one or more users access to present account data and to receive instructions for the manipulation of funds in one or more accounts of the one or more users;
   a bill-pay engine, the bill-pay engine including:
   an internal data source access engine, the internal data source access engine having a plurality of internal data source software objects, each of which configured to provide access to data maintained by an internal system;
   an external data source access engine, the external data source access engine having at least one external data source software object configured to provide access to data maintained by an external system;
   an integration engine to receive internal data from the internal data source access engine and external data the external data source access engine and to combine the internal data and the external data into a single unified data set; and
   a user interface module to receive the single unified data set and format it to be displayed graphically to a user, the user interface module to additionally send the formatted single unified data set to the web access gateway for further transmission to a computing device of the one or more users;
   a plurality of internal data stores, each of which accessible by at least one of the internal data source software objects; and
   a payment module configured to transmit instructions to the internal and external systems through the internal data source software object and the external data source software object, respectively, the instructions intended to generate a physical check payable from at least one of the internal and external systems and payable to at least one other of the internal and external systems.

7. The machine-readable medium of claim 6, wherein the at least one external data source software object is configured to access the external system using a web services framework, the access defined by a Web Services Definition Language (WSDL) published by the external system.

8. The machine-readable medium of claim 7, wherein the at least one external data source software object is a Java 2 Enterprise Edition (J2EE) web services client.

9. The machine-readable medium of claim 7, wherein the WSDL is consumed dynamically concurrent with the access.

10. The machine-readable medium of claim 6, wherein the plurality of internal data source software objects are pre-configured prior to accessing the data maintained by the at least one of the plurality of internal systems.

11. A system to provide a unified graphical presentation of disparate data sources to a user, the system comprising: a processor; and a storage device having machine-readable instructions contained therein which cause the processor to operate the following software modules:

a user access system to provide to one or more users access to present account data and to receive instructions for the manipulation of funds in one or more accounts of the one or more users;

a bill-pay engine, the bill-pay engine including:

an internal data source access engine, the internal data source access engine having a plurality of internal data source software objects, each of which configured to provide access to data maintained by an internal system;

an external data source access engine, the external data source access engine having at least one external data source software object configured to provide access to data maintained by an external system;

an integration engine to receive internal data from the internal data source access engine and external data the external data source access engine and to combine the internal data and the external data into a single unified data set; and a user interface module to receive the single unified data set and format it to be displayed graphically to a user, the user interface module to additionally send the formatted single unified data set to the web access gateway for further transmission to a computing device of the one or more users;

a plurality of internal data stores, each of which accessible by at least one of the internal data source software objects; and a payment module configured to transmit instructions to the internal and external systems through the internal data source software object and the external data source software object, respectively, the instructions intended to generate a physical check payable from at least one of the internal and external systems and payable to at least one other of the internal and external systems.

12. The system of claim 11, wherein the at least one external data source software object is configured to access the external system using a web services framework, the access defined by a Web Services Definition Language (WSDL) published by the external system.

13. The system of claim 12, wherein the at least one external data source software object is a Java 2 Enterprise Edition (J2EE) web services client.

14. The system of claim 12, wherein the WSDL is consumed dynamically concurrent with the access.

15. The system of claim 11, wherein the plurality of internal data source software objects are pre-configured prior to accessing the data maintained by the at least one of the plurality of internal systems.

\* \* \* \* \*